United States Patent [19]
Gagnon et al.

[11] Patent Number: 5,848,867
[45] Date of Patent: Dec. 15, 1998

[54] STORAGE RACK WITH OVERHEAD LOADING AND UNLOADING

[76] Inventors: Pierre Gagnon, 195, Côte Ste-Catherine, Montreal, Quebec, Canada, H2V 2B1; Pierre Laforest, 1608, Jacques Lemaître, Montreal, Quebec, Canada, H2M 2C4

[21] Appl. No.: 795,757

[22] Filed: May 28, 1996

[30] Foreign Application Priority Data

Jan. 26, 1996 [CA] Canada ................................ 2168147

[51] Int. Cl.⁶ .................................................. B65G 1/04
[52] U.S. Cl. .......................... 414/281; 414/155; 414/191; 414/286; 414/626
[58] Field of Search .................................. 414/155, 172, 414/191, 267, 269, 277, 279, 281, 286, 458, 560, 626, 658; 294/67.31, 110.1

[56] References Cited

U.S. PATENT DOCUMENTS

| | | | |
|---|---|---|---|
| 1,009,557 | 11/1911 | Pauly | 414/281 |
| 2,605,004 | 7/1952 | Grueneberg | 414/155 X |
| 3,011,661 | 12/1961 | Thomas et al. | 414/282 |
| 3,261,637 | 7/1966 | Bopp et al. | 294/67.31 X |
| 4,338,056 | 7/1982 | Abrahamson et al. | 414/152 |
| 4,572,719 | 2/1986 | Theobald | 414/286 X |
| 4,592,692 | 6/1986 | Suiza et al. | 414/626 X |
| 4,778,325 | 10/1988 | Stolzer et al. | 414/286 X |
| 4,895,101 | 1/1990 | Knorr | 414/626 X |
| 4,923,354 | 5/1990 | Giuliano et al. | 414/286 |

*Primary Examiner*—James W. Keenan
*Attorney, Agent, or Firm*—François Martineau

[57] ABSTRACT

A storage rack is loaded and unloaded from the top with pallets carrying articles to be stored in and retrieved from the rack. The rack consists of a series of spaced columns arranged in parallel rows defining wells accessible from the top; the columns have vertically spaced, upwardly facing sets of steps protruding to an equal extent towards the centre of the wells. A crane is horizontally movable over the rack and stoppable above a selected well; it has a hoisting block which can be lowered between and guided by the columns of the selected well; a pair of hooks are pivoted to the hoisting block for movement towards and away from each other between opened and closed position; a pair of Z-shaped pallet holding beams adapted to carry a series of pallets aligned in end to end relation are suspended from the hooks and clear the steps when in closed position. When the desired set of steps is reached, the hooks are opened causing spreading apart of the top portion of the Z beams to allow their hooking unto these steps. The reverse operation is effected for unloading. The hooks can handle the Z beams to pick up the aligned pallets from and deposit them onto a supporting surface. The system is particularly designed for loading green concrete blocks into and unloading cured concrete blocks from a curing kiln housing the rack. Preferably, the green blocks are left in the stored position between the columns of the kiln just to attain sufficient compressive strength; they are then unloaded and directly stacked on the floor beside the rack within the kiln with the intermediary only of the pallets for completion of the curing process in the kiln; thus the number of columns and Z beams can be decreased without reducing the effective curing capacity of the kiln. Also, the provision of a Z beams accumulating device is no longer required.

25 Claims, 11 Drawing Sheets

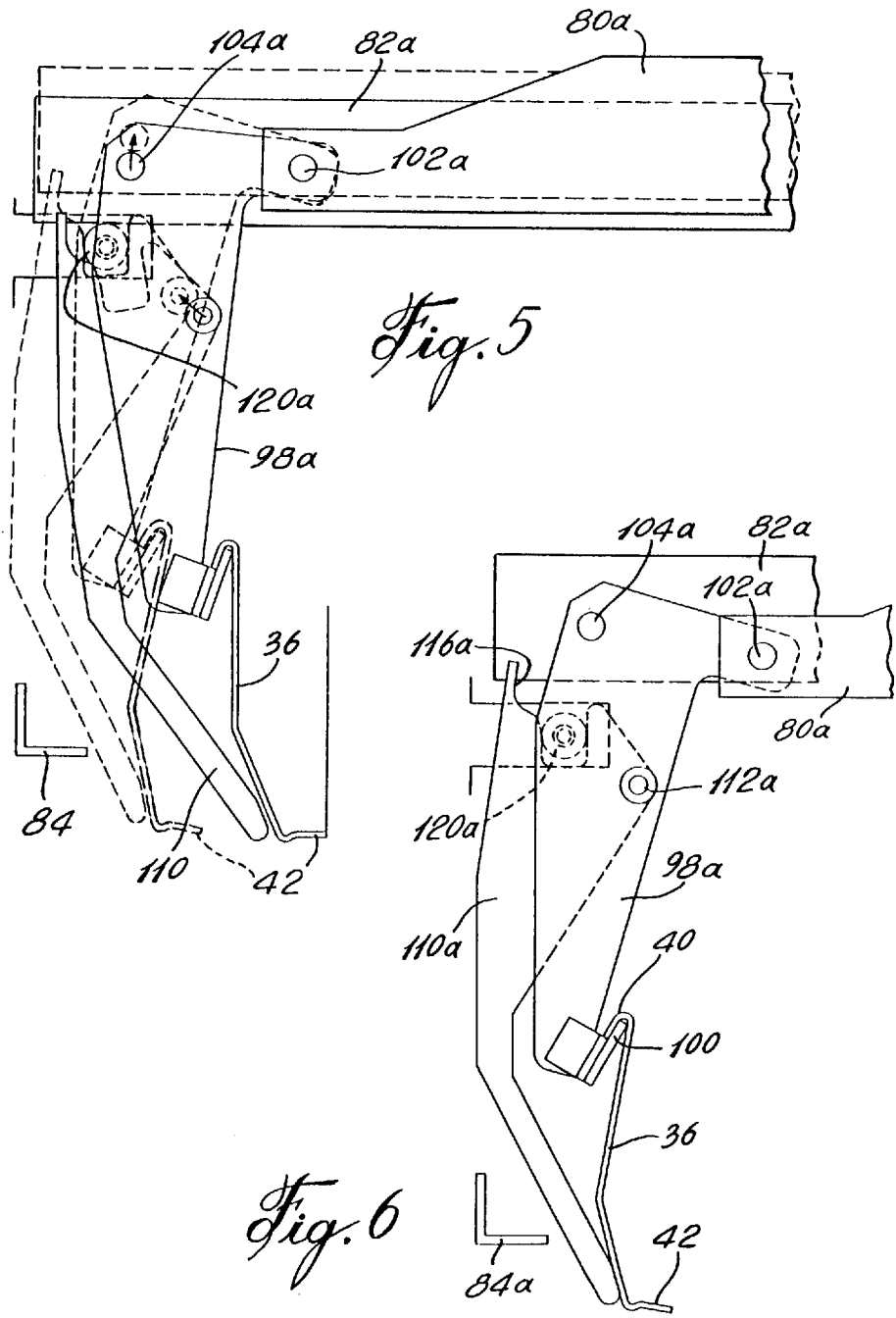

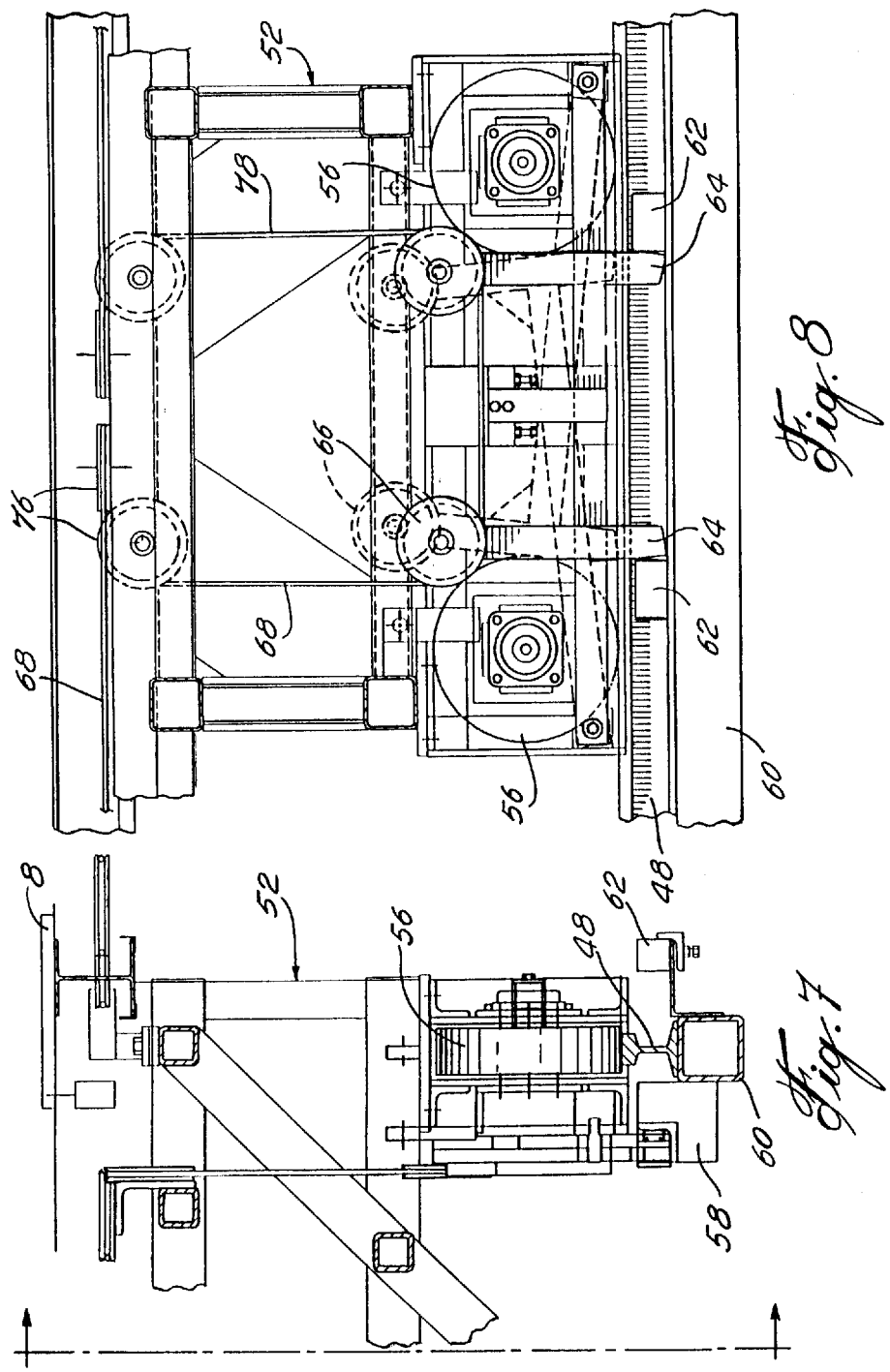

5,848,867

STORAGE RACK WITH OVERHEAD LOADING AND UNLOADING

FIELD OF THE INVENTION

The present invention relates to a storage rack and to a system for loading and unloading said storage rack with pallets carrying articles to be stored and retrieved from said rack. More particularly, the invention concerns the rack of a concrete block curing kiln and associated loading and unloading equipment.

BACKGROUND OF THE INVENTION

In Applicants' co-pending patent application 08/354,258 filed Dec. 12, 1994 and entitled STORAGE RACK LOADING AND UNLOADING SYSTEM, now abandoned, the storage rack is composed of several bays disposed side by side and opening at the front face of the rack, each bay formed of a series of stacked tiers, each provided with a pair of horizontally arranged tracks extending from the front to the back of the rack and supported by posts or columns. The articles carrying pallets are accumulated in front of the rack with the pallets in end-to-end alignment normal to the face of the rack and in a number to have a combined length equal to approximately the depth of the bays; a pusher/puller system is suspended from a travelling crane to pick up the assembled and aligned pallets by means of Z-shaped pallet holding beams and to push the assembly of the Z beams and aligned article blocks carrying pallets into a selected tier of a selected bay with the pallets suspended from the tracks by the Z-beams. To unload, the assembly is pulled completely out of the rack outwardly of its front face. While this system is thought to be an important improvement over previously known systems, it is now believed that additional important improvements can be obtained by providing a storage rack which can be loaded and unloaded from the top by mechanical means without requiring direct human intervention contrary to the known top loaded and unloaded rack described in A. A. PAULY's U.S. Pat. No. 1,009,557 dated Nov. 21, 1911 entitled APPARATUS FOR CURING CEMENTITIOUS MATERIAL.

OBJECTS OF THE INVENTION

It is the general object of the present invention to provide a storage rack with an overhead loading and unloading system resulting in more flexibility in storing articles of variable standard height while reducing the dead space to a minimum.

Another object of the present invention is to provide a storage rack to be loaded and unloaded from the top and including a minimum of framework, the tracks, in accordance with the above defined storage rack, being completely eliminated.

Another object of the present invention resides in the provision of a loading and unloading system in which the pusher and puller system of the above noted co-pending Patent application is completely eliminated.

Another object of the present invention resides in the provision of a method for curing concrete blocks using a curing kiln in which said storage rack is used only for partial curing of the blocks, final curing being achieved in the kiln with the units formed by the blocks and their pallets directly stacked on top of one another after the blocks have achieved a compressive strength sufficient to support, for instance a stack of ten such units, thus the kiln's effective curing capacity can be maintained while reducing the amount of framework required to handle the concrete blocks.

Another object of the invention resides in the provision of a system of the character described in which the size of the building for housing the storage rack and the loading and unloading system can be considerably decreased with respect to the system of the above noted U.S. patent application.

SUMMARY OF THE INVENTION

The present invention is directed to the combination of a storage rack and of a loading and unloading system for pallet carrying articles to be stored and retrieved from said storage rack, said rack including vertical elongated wells arranged side by side in parallel rows and delimited by parallel rows of spaced columns, each well being of uniform width along its length and fully opened at the top, said system including crane means including a travelling bridge and a hoisting block and movable over and across said storage rack, said hoisting block operable to hoist or lower an article carrying pallet from and onto a support surface outside of said storage rack, move said pallet over said storage room in vertical register with any selected well and then lower or hoist said article carrying pallet down or up said well to or from a selected level and further including means carried by said hoisting block and actuated from said travelling bridge to lock and unlock said pallet within said well at said level.

The present invention is preferably directed to the combination of a storage rack and of a loading and unloading system for articles carrying pallets to be stored within and retrieved from said storage rack, said storage rack comprising a plurality of spaced columns arranged therein in parallel rows to form several open top elongated storage wells disposed side by side, the columns on each side of anyone well having a series of vertically spaced upwardly facing steps equally protruding from said columns towards the centre of said well, said steps forming sets of steps which are at the same level; said loading and unloading system comprising a pallet holder to carry a series of said pallets in end-to-end relation, said pallet holder consisting of a pair of Z beams disposable along opposite sides of said series of pallets, each Z beam of Z-shaped cross-section defining a lower inturned flange to extend under and support said series of pallets and an upper outturned flange, a crane including a hoisting block, motorized means to move said hoisting block over and across said wells and to stop said hoisting block above a selected well, means to lower and hoist said hoisting block between said columns of said selected well, a pair of hooks pivotally carried by and depending from said hoisting block, actuating means to pivot said hooks towards and away from each other between an opened and a closed position relative to said hoisting block, the upper outturned flange of said Z beams engageable by said hooks whereby said article carrying pallets can be suspended by said hooks through said Z beams, the assembly of said article carrying pallets, said Z beams, said hooks and said hoisting block clearing said steps when said hooks are in closed position so that said article carrying pallets can be hoisted or lowered through said well up from or down to a selected level, opening of said hooks from said closed position causing spreading apart of said outturned flanges of said pair of Z beams and allowing their transfer into engagement with a corresponding set of steps at said selected level.

Preferably, said lower inturned flange of said Z beams has a size to extend only under a side marginal portion of said pallets, and said hooks can pivot to a more opened position to cause said lower inturned flange to clear said side marginal portions of said pallets when the latter are supported on a support surface leaving said marginal portions exposed.

Preferably, said storage wells are of equal width and length and said series of steps are equally spaced along said columns, said Z beams having a length substantially equal to the length of said storage wells and each well is subdivided into equal size sub-wells of quadrangular cross-section and delimited by said columns located at the four corners of said sub-wells, are equally spaced longitudinally of said storage wells and form pairs of transversely aligned columns for each storage well, said hoisting block being subdivided into sub-blocks interconnected in end-to-end relationship, any one sub-block of a width and length to be hoisted and lowered between and guided by the columns delimiting a sub-well.

Preferably, the columns have an H-shaped cross-section defining a web and right angle flanges, said hoisting block carrying guiding wheels engageable with said flanges of said columns to guide said hoisting block during its hoisting and lowering movement within anyone storage well.

Preferably, the steps are formed by stamped, outwardly inclined portions of the column flange.

Preferably, the motorized means includes a travelling bridge movable over and across said wells, and further including first and second cable means extending between said hoisting block and said travelling bridge, said hoisting block including an outer frame and an inner frame guided for vertical movement with respect to each other, said outer and inner frames respectively carrying first and second cable engaging pulleys, said first and second cable means trained on said first and second cable engaging pulleys respectively, the upper end of each said hook pivoted to said outer and inner frames by pivots transversely spaced relative to both frames whereby selective hoisting movement of said outer and inner frames by first and second pulleys will cause pivoting of said hooks between said closed position and said opened position.

Preferably, a cam member extends along each hook and its upper end is pivoted to said hook, each cam member having a lower portion protruding downwardly from the lower end of said hook and engageable with the outside of a Z beam suspended from several said hooks, each cam member having a cam edge, and a cam follower carried by one of said frames and following said cam edge during pivoting movement of said hooks, whereby upon opening movement of said hooks and consequently of the outturned flanges of said Z beams, said inturned flanges of said Z beams are positively maintained by said lower portions of said cam members in supporting engagement with said series of pallets, and upon closing movement of said hooks said lower portions of said cam members positively push said Z beams inwardly towards said pallets causing said inturned lower flanges to come in supporting engagement with said series of pallets.

Preferably, each Z beam has a web formed of an upper section and of a lower section, both sections making an obtuse angle with respect to each other, said upper section terminated by said outturned flange and of a width sufficient to abut against two adjacent vertically spaced sets of steps when said outturned flange is hooked onto the upper one of said two sets of steps, to therefore maintain said lower section at a downwardly inwardly inclined position so that said pallets can be made of a size to clear said steps with a sufficient gap during their hoisting and lowering movement through said well and yet be positively maintained in stored position by the lower inturned flanges of said Z beams.

Preferably, a pair of rails are horizontally disposed at the top of said storage rack perpendicularly to the respective ends of said storage wells, said rails extending across and beyond one end of said storage rack, said travelling bridge rollable on and guided by said rails, said first and second cable means trained on pulleys carried by said travelling bridge, first power operated cable shortening means to shorten one of said first and second cable means relative to the other, cable pay-out and retrieving power operated means operating said first and second cable means to lower and hoist said hoisting block relative to said travelling bridge, third cable means and third power operated winch means to selectively move said travelling bridge across said wells to positions above any selected well and an outer position laterally of said one end of said storage rack, said cable shortening means, cable pay-out and retrieving means and winch means being located laterally outwardly of said one end of said storage rack.

Preferably, the travelling bridge has an inverted U-shape and said hoisting block has a size and shape such that, in its uppermost hoisted position, it completely nests within said travelling bridge to clear the top of said wells.

Preferably, vertical, elongated guiding members are carried by said travelling bridge and in vertical alignment with the columns of said selected well above which said hoisting block is stopped, and guide wheels carried by said hoisting block, engage only said guiding members when said hoisting block completely nests within said travelling bridge, engage both said guiding members and the columns of said selected well when said hoisting block is partially nested within said travelling bridge and engage only the columns of said selected well when said hoisting block is completely located within said selected well.

Preferably, there are further provided a vertically movable locking pin carried by said travelling bridge at each end thereof, a pulley attached to each locking pin, fourth cable means extending along both rails trained on each pulley and anchored to a fixed point at one end and fourth cable tightening means attached to the other end of said fourth cable means to selectively tighten said fourth cable means with the consequent raising of said locking pin or release of said fourth cable means with the consequent lowering of said locking pin, and abutment means at each well and along each rail to engage said locking pins only when the latter are lowered and to consequently positively position said travelling bridge in vertical alignment with said selected well.

Preferably, the third cable means include a cable loop associated with and attached to each end of said travelling ridge, said winch means including a winch for each cable loop, each cable loop including a pay-out run and a return run extending between said winch and said travelling bridge and means to align said travelling bridge with said wells including cable shortening powered means for at least one cable loop to alternately shorten and lengthen said pay-out run and simultaneously alternately lengthen and shorten said return run in equal amount.

Preferably, each winch includes a drive shaft of polygonal cross-section, a winch drum non-rotatably mounted and axially shiftable on said drive shaft, said drum having a helicoidal groove receiving a few turns of the loop cable driven by said drum and the two drive shafts are driven by a common motor.

Preferably, each well is subdivided into equal size sub-wells of rectangular cross-section and delimited by said columns being located at the four corners of said sub-wells, said hoisting block being subdivided into as many sub-blocks as there are sub-wells, said sub-blocks interconnected in end-to-end relationship, any one sub-block being rectangular and of a width and length to be hoisted and lowered between and guided by the columns delimiting a sub-well, said first and second cable means including, for each sub-block, a looped cable anchored to a stationary station at the opposite end of said rack relative to said one end of said rack and a counter weight suspended by said looped cables and biasing said interconnected sub-blocks to an uppermost position clearing the top of said wells when said sub-blocks are not loaded with article carrying pallets.

Preferably, levelling means serve to level the assembly of interconnected sub-blocks.

In a specific application of the present invention, the storage rack is located in an enclosure having walls, a roof and heating means to form a concrete block curing kiln, said roof spaced above said walls, one of said walls having an opening to access the top of said rack, a door for said opening, said articles being green concrete blocks to be cured in said kiln with the blocks and pallets carrying the same stored in said wells with the green blocks on one set of aligned pallets spaced below an adjacent set of aligned green block carrying pallets.

There may be provided a storage floor area within said kiln, said motorized means capable of moving said hoisting block over said floor area as well as over and across said wells, said crane capable of successively loading said wells of said kiln with green blocks carrying pallets and, after partial curing of said blocks within said rack, of successively unloading the partially cured blocks together with their supporting pallets from a selected well and directly stacking said blocks and their pallets onto said floor area and retrieving said Z beams to form stacks of blocks with intervening pallets, the block of these stacks being left to fully cure in the kiln.

The present invention is also directed to a method for curing concrete blocks comprising the steps of:

a) positioning green blocks on a predetermined number of separate pallets, aligning said pallets and fitting a pair of support beams to opposite sides of said aligned pallets to form a first assembly of a given length;

b) hoisting said first assembly to a level higher than the top of a rack located in a concrete block curing kiln and forming vertical elongated wells of a length and width slightly greater than the length and width of said assembly, said wells accessible from the top end and disposed side by side, each well delimited by parallel rows of columns carrying vertically spaced steps protruding from said column towards the centre of said wells, the steps forming sets of steps at the same level;

c) horizontally moving said first assembly to a position above a selected well and in longitudinal register therewith;

d) lowering said first assembly through said selected well and hooking the support beams of said first assembly to a lower set of steps in a stored position;

e) repeating steps a) to c) with a second assembly substantially identical to said first assembly;

f) lowering said second assembly through said selected well and hooking the support beams of said second assembly to a higher set of steps, the two assemblies being vertically spaced from each other; and g) allowing the green blocks to cure in said kiln.

Preferably, after partial curing of said green blocks in said second assembly is hoisted out of said well and lowered directly onto a support surface inside of said kiln, said support beams of said second assembly are retrieved, said first assembly is hoisted out of said well and lowered onto the second assembly until the pallets of said first assembly rest directly on the partially cured concrete blocks of said second assembly to form a stack, the support beams of said first assembly are retrieved from the pallets of said first assembly and the stack of concrete blocks are left to fully cure in said kiln.

It has been found that a stack of ten such assemblies of partially cured concrete blocks can be formed without block damage.

BRIEF DESCRIPTION OF THE DRAWINGS

In the annexed drawings.

FIGS. 5 and 6 are partial sections taken along line 5—5 of FIG. 3, showing two different pivoted positions of a second preferred embodiment of the hooks;

FIG. 7 is a cross-section of one end of the travelling bridge and of one rail supporting the same;

FIG. 8 is an end view of the travelling bridge taken along line 8—8 of FIG. 7;

FIG. 10 is a perspective view of half of the actuating arrangement for controlling the travelling bridge, the hoisting block and its hooks, the other half being similar;

DETAILED DESCRIPTION OF THE PREFERRED EMBODIMENT

Figure 1:
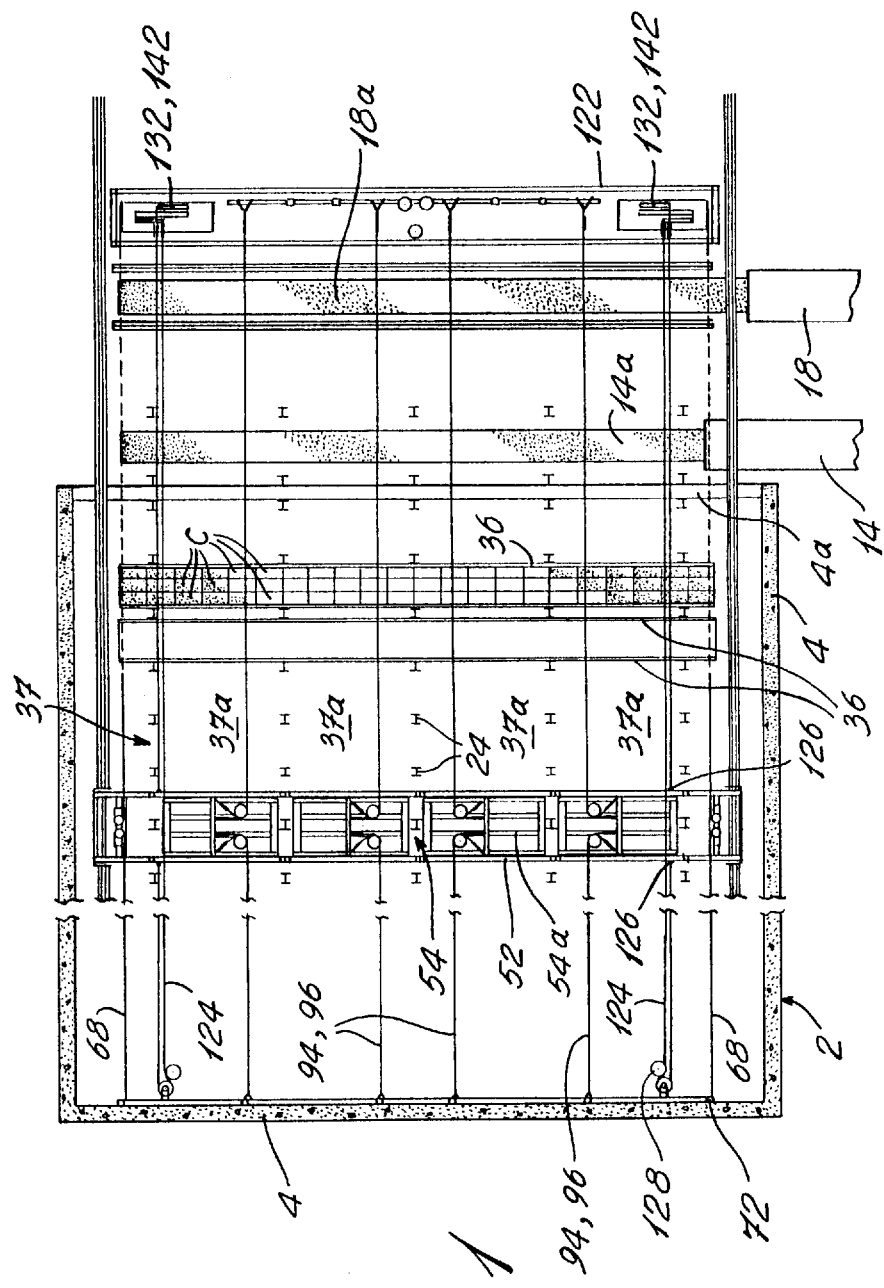
FIG. 1 is a top plan view of the general arrangement of the system in accordance with the invention, the kiln shown without its roof.
Figure 2:
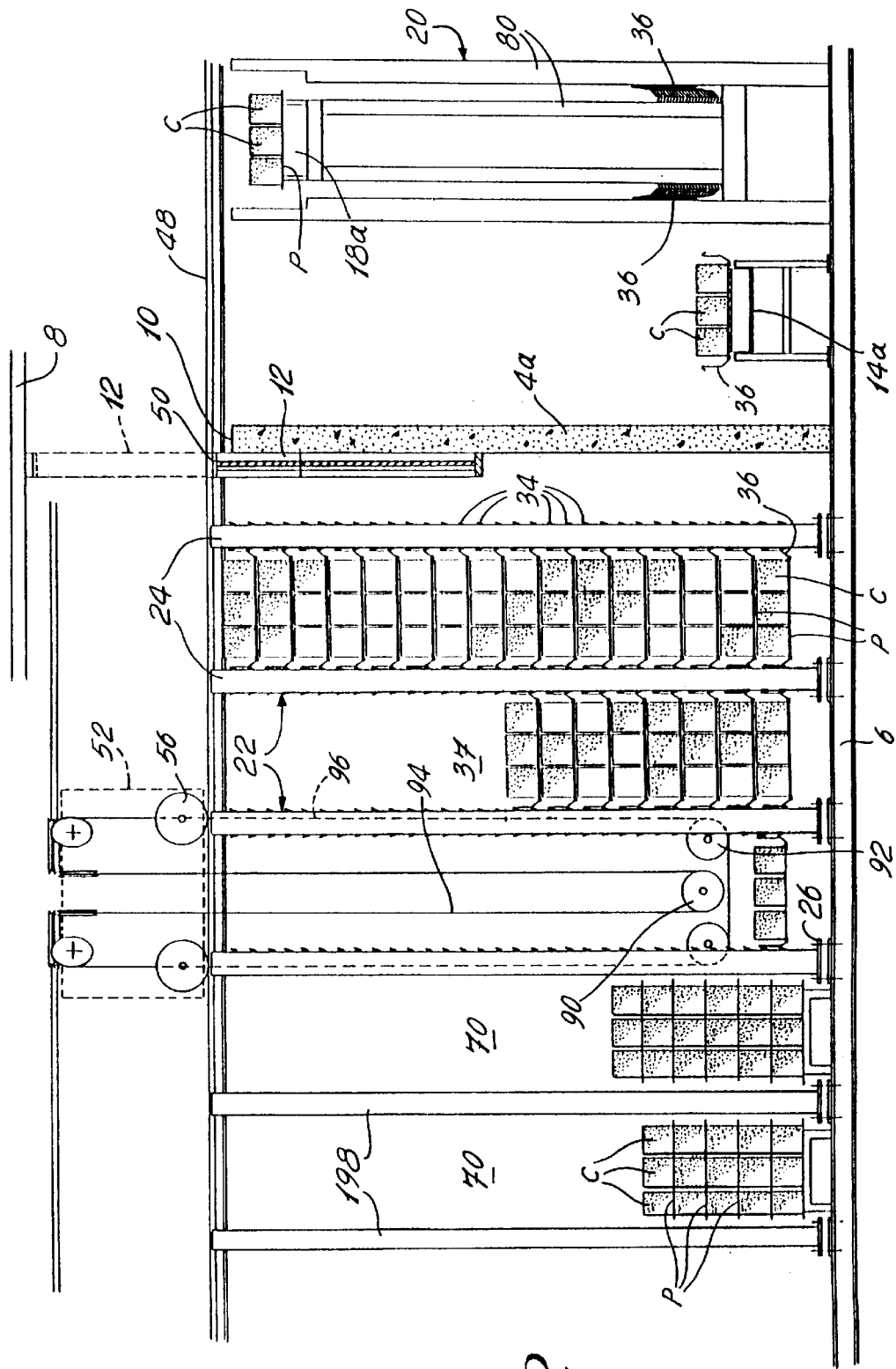
FIG. 2 is a diagrammatic elevation of the kiln, the storage rack within the kiln and schematic cross-section of the green block and dry block conveyors and of the Z beam accumulator.

Referring to FIGS. 1 and 2, there is shown a concrete block curing kiln 2 which is delimited by walls 4, a floor 6, a roof 8. One end wall 4a has a door opening 10 adjacent the roof 8 which is closable by a vertically movable door 12 which is moved between a closed, raised position shown in dotted line and an open, lowered position shown in full line. The door is counter-balanced to closed fail safe, position by a counter-weight arrangement (not shown).

FIGS. 1 and 2 also show a green block conveyor 14 coming from a concrete block moulding machine (not shown), a dry block conveyor 18 for receiving the blocks which have been cured in the kiln and a Z beam accumulator 20 mounted underneath the dry block conveyor 18.

A storage rack is located within kiln 2. This rack simply consists of a series of columns 24 arranged in parallel rows and right angle cross rows, each column having a foot plate 26 which is fixed to the floor 6 by means of a bolt and nut arrangement 28 (see also FIG. 4) which enables levelling and inclining of each column. Each column has an H shape being preferably made of two oppositely directed channels (see FIG. 3) secured together and defining a web 30 and flanges 32. A series of ears 34 are stamped out of flanges 32 on opposite sides of the column, these ears 34 form equally vertically spaced upwardly directed steps.

Figure 4:
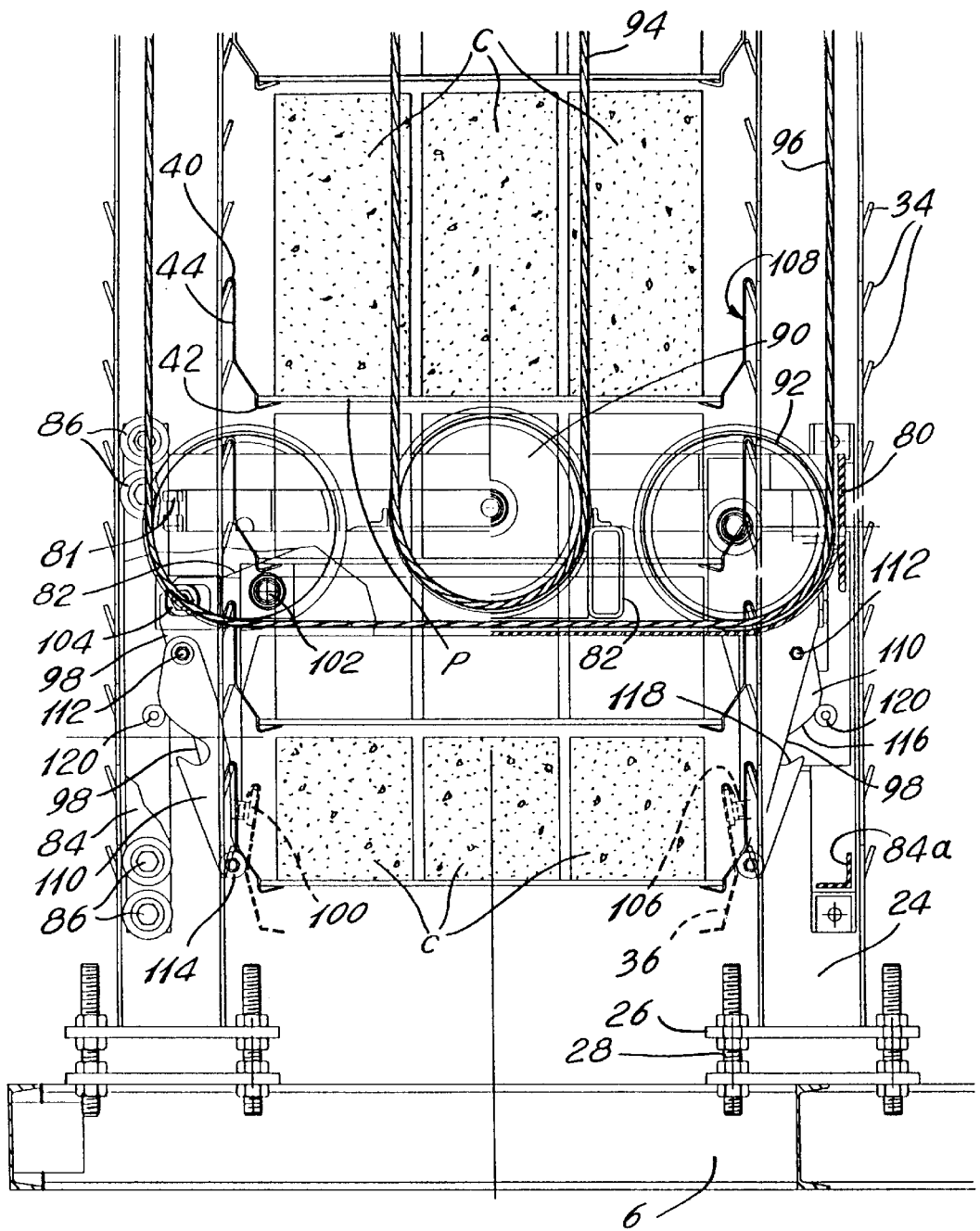
FIG. 4 is a cross-section of the hoisting block showing one embodiment of the hooks, in the process of transferring the Z beams to the steps of the columns of the well, this Figure also showing how the Z beam can support pallets carrying blocks of different heights.

Referring to FIGS. 1, 2 and 4, freshly moulded concrete blocks C coming from the concrete block moulding machine are carried on the conventional pallets P, which normally consist of a thin steel plate, these green blocks must be stored within the storage rack 22 for curing kiln 2. For this purpose, the blocks carrying pallets P are accumulated in contiguous relation on the portion 14a of the green block conveyor 14, this portion being parallel to and adjacent the door opening 10 as seen in FIG. 1. A pair of Z beams 36 are used to engage in the group of accumulated pallets P and to carry the same into the kiln and to suspend the pallets and blocks on the steps 34 of the selected rows of columns and at a selected level to be cured. Z beams are also used to remove the pallets with the cured blocks C and transfer them to the conveyor section 18a of dry block conveyor 18.

Figure 3:
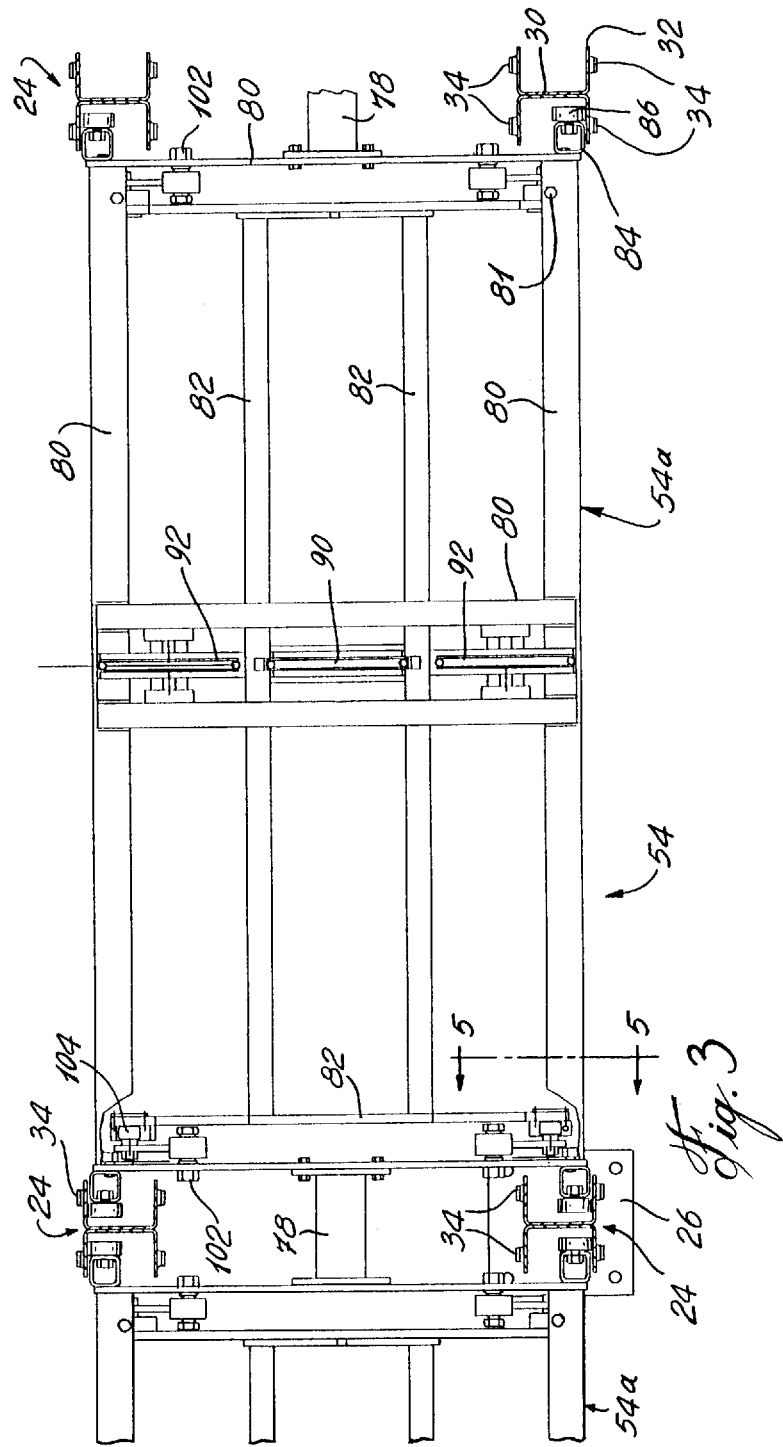
FIG. 3 is a partial top plan view of the hoisting block shown in engagement with the columns of the well, the columns shown in cross-section.

As more particularly shown in FIG. 4, each Z beam 36 has a length about equal to that of conveyor section 14a and such as to extend across the entire length of a well 37 which extends across the kiln parallel to the conveyor sections 14a and 18a therebeing several wells disposed side by side, each delimited by two parallel rows of columns with, for the intermediate wells, one row being common to two adjacent wells. Each well 37 is in turn divided into, for instance, four sub-wells (as shown in FIG. 1), each sub-well 37a being of rectangular shape and delimited by four columns 24 (as shown in FIG. 3). For the intermediate wells, columns 24 are common to two adjacent sub-wells.

Figure 13:
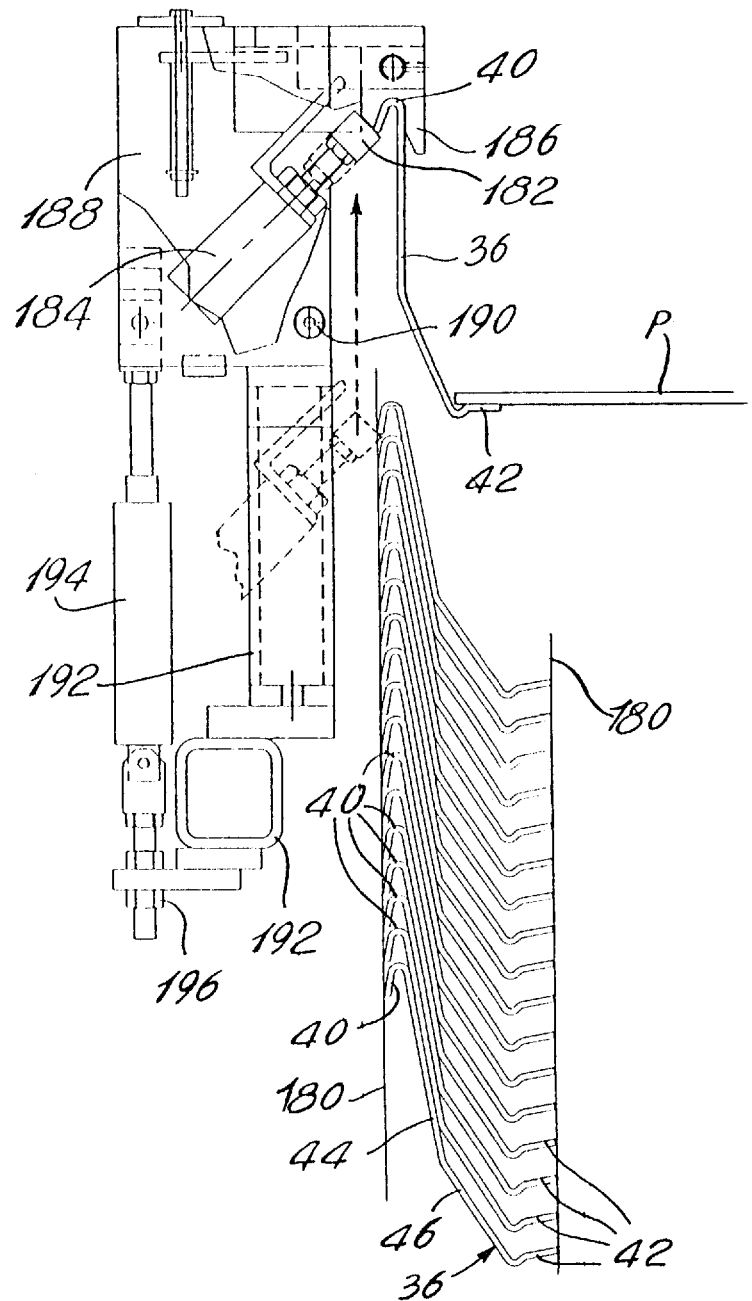
FIG. 13 is a side elevation of the Z beam transferring mechanism which is part of the Z beam accumulator.

Each Z beam 36 defines a web with an upper outturned flange 40 and a lower inturned flange 42 (see FIGS. 4 and 13). Moreover, the upper section 44 of the web makes an obtuse angle with respect to the lower section 46 of the web. Upper web section 44 has a width slightly greater than the distance between two consecutive steps 34 of one column so that in pallets suspending position (shown in FIG. 4) with outturned flange 40 engaging a series of steps at the same level, the web upper section 44 is maintained substantially vertical since it abuts against the steps at the next lower level. In this manner, the lower inturned flanges 42 of the Z beams 36 which engage under the sides of the pallets P are maintained sufficiently away from steps 34. It follows that the spacing between the columns can be selected so as to obtain a good clearance between the sides of the pallets P and the columns, and consequently of the Z beams when the assembly of the Z beams, pallets and concrete blocks are being lowered or hoisted within a selected well 37.

A pair of parallel rails 48 extends within the kiln to and outside of the same at the level of the top of the columns 24 and perpendicularly to wells 37 and to the conveyor sections 14a and 18a. Rails 48 are interrupted at the door opening 10 for the passage of the door. However, this door has rail sections 50 on the top thereof to bridge the interruption in the rails 48 when the door is in lowered position, giving access to the kiln. A crane is used to transport the assembly of the Z beams 36 with the concrete block carrying pallets P from the green block conveyor 14 into the storage rack 22 and after curing from the kiln onto the dry block conveyor 18. The crane comprises a travelling bridge 52 and a hoisting block 54 suspended from the travelling bridge. Block 54 has a length to extend through an entire well 37, across nearly the entire distance between rails 48.

Figure 9:
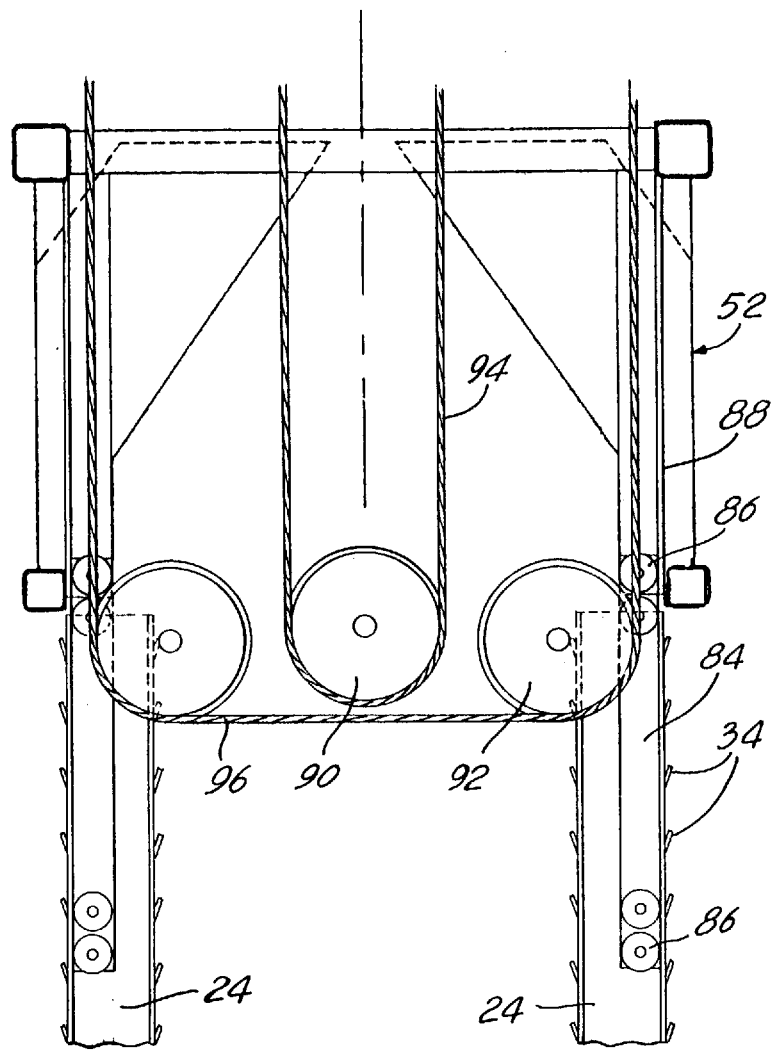
FIG. 9 is a cross-section of the travelling bridge showing the hoisting block in the process of being guided from within the travelling bridge to within a well of the storage rack;.

As shown in FIGS. 7 to 9, travelling bridge 52 is of generally inverted U shape and is provided at its ends with wheels 56 which rolls on rails 48. Travelling bridge is guided on the rails 48 by side shoes 58 slidably engaging beams 60 supporting the rails 48. Stops 62 are fixed to beam 60 at predetermined positions along the rails 48 to be engaged by a pair of locking pins 64 vertically movable and guided by the frame work of the travelling bridge 52 to take a lowered position as shown in full line in FIG. 8 abutting the stops 62 to positively lock the travelling bridge 52 in vertical alignment with a selected well 37. The locking pins 64 carry pulleys 66 at their upper ends on which a cable 68 is trained. Upon tightening cable 68, pulleys 66 raise the associated locking pin 64 to clear the stops 62 to enable movement of the travelling bridge. The latter can move along rails 48 to be positioned above any selected well 37 and to positions outside kiln above conveyors 14 and 18. The travelling bridge can also move within the kiln to positions above secondary wells 70 (as shown in FIG. 2) which will be described later on.

Figure 10:
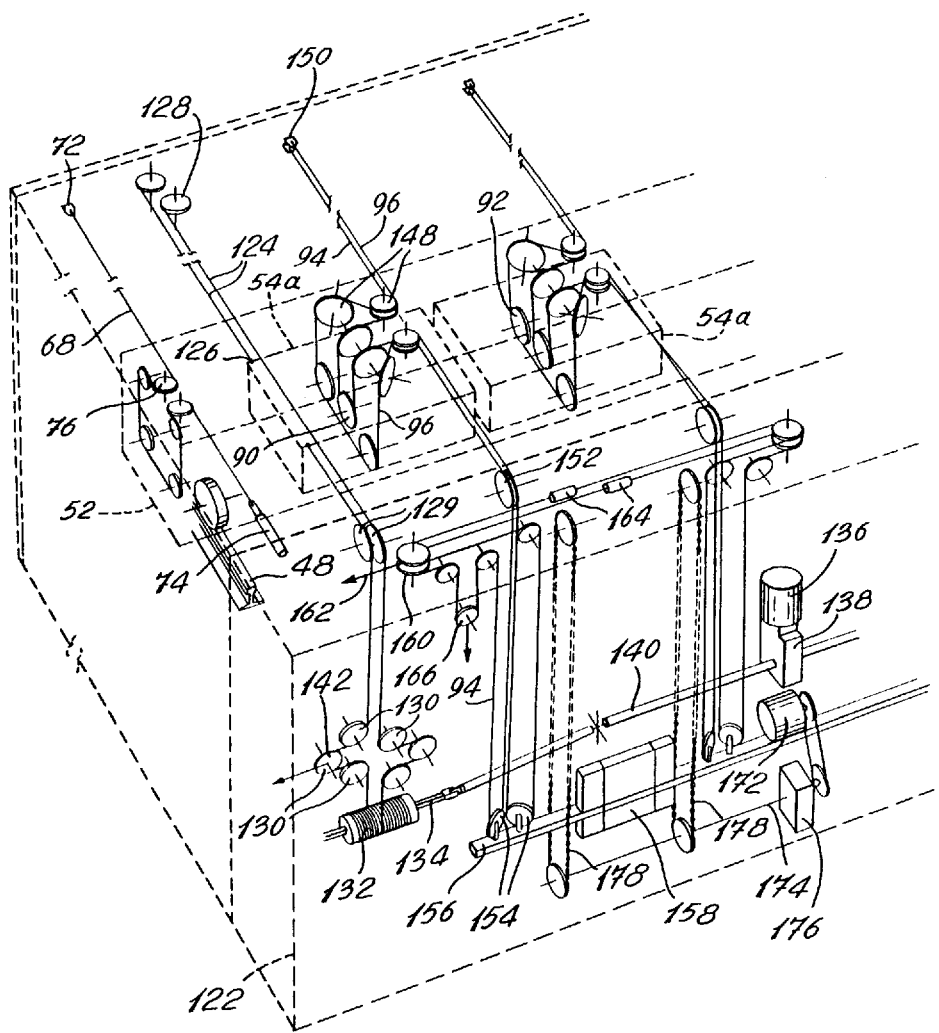

As shown in FIG. 10, both ends of the travelling bridge 52 can be positively stopped at any one of the selected positions by the locking pins 64 and stops 62. The cable 68 at each end of the travelling bridge is anchored to a fixed point at 72 at the remote end of the kiln while its other end is attached to the piston of a hydraulic cylinder 74 which serves to tighten cable 68 and thus raise pulleys 66 and locking pins 64. Pulleys 66 together with the pulleys 76 carried by the travelling bridge and on which cable 68 is trained, allow the movement of the travelling bridge along rails 48.

Hoisting block 54 consists of several sub-hoisting blocks 54a rigidly maintained in alignment by links 78 (as shown in FIG. 3). Each sub-block 54a is of a generally rectangular shape and of a size to fit within a sub-well 37a as delimited by four columns 24 arranged at the four corners of the sub-well. Each sub-block 54a includes an outer frame 80 and an inner frame 82, the latter mounted within the former. Links 78 interconnect the four outer frames 80. Outer and inner frames 80 and 82 can move vertically, one relative to the other. The outer frame 80 has, at its four corners, downwardly depending guiding members 84 reinforced by horizontal braces 84a and provided at their upper and lower ends with guiding wheels 86. These guiding wheels 86 engage the flanges 32 of the columns 24 when the hoisting block is being raised or lowered within a sub-well delimited by said columns.

Also, the guiding wheels 86 come in guiding engagement with vertical guiding members 88 carried by the travelling bridge 52. Each sub-block 54a is therefore retained in bridge 52 when completely nested therein and is continuously guided while being transferred from the travelling bridge to the columns, and vice versa, since guiding members 88 form upward extensions of the columns.

Inner frame 82 carries an inner pulley 90 while outer frame 80 carries a pair of outer pulleys 92, pulleys 90 and 92 being disposed across the middle of the sub-block 54a (see FIGS. 3 and 4). Inner cable 94 and outer cable 96, trained respectively on inner pulley 90 and the two outer pulleys 92, serve to selectively raise the inner frame with respect to the outer frame and vice versa. These two cables also suspend each sub-block 54a from the travelling bridge and serve to raise or lower hoisting block 54 as will be described later on. Referring to FIG. 3, it is seen that the inner frame 82, when raised relative to outer frame 80, attains a top limit position in which it stops against an adjustable abutment member 81, secured to outer frame 80 and which is preferably adjustable. The two frames are guided for relative vertical movement. Abutments (not shown) limit the downward movement of inner frame 82 to a lower limit position. Each sub-block 54a carries, at its two ends, a pair of transversely disposed and inwardly facing hooks 98 which clear the transversely aligned columns 14 inwardly thereof. A preferred embodiment of the hooks is shown at 98a in FIGS. 5 and 6.

Each hook 98 or 98a is of generally triangular shape carrying, at its lower end, a hooking plate 100 to engage the outturned upper flange 40 of the Z beam 36; referring to FIG. 4, the upper portion of each hook 98 is pivoted at 102 to outer frame 80 and at 104 to inner frame 82. Pivots 102, 104 are transversely aligned with respect to the sub-block 54a. Pivot 104 has a sliding fit on inner frame 82. Lengthening of the inner cable 94 with respect to the outer cable 96 causes lowering of the inner frame 82 with respect to the outer frame 80 and consequently closing movement of the facing hooks of a given pair to a closed position shown at 106 in FIG. 4 in which the hooks and consequently the Z beams hooked onto the same and the assembly of the pallets P and blocks C can clear the steps 34 protruding inwardly within the sub-wells 37a. It follows that the hoisting block 54 consisting of several, for instance four interconnected sub-blocks 54a, can raise and lower the assembly of the Z beams, pallets and concrete blocks within a selected well. The load is thus mainly supported by two outer pulleys 92 when the hoist is loaded with blocks C.

Upon shortening of the inner cable 94, the load on the sub-block is sufficiently transferred on the inner pulley 90 to cause raising movement of the outer frame 80 relative to the inner frame 82. As a consequence, the hooks 98 can take an intermediate opened position bringing the outturned upper flange 40 of the Z beams 36 in vertical alignment with the steps 34 so as to enable transfer of these Z beams onto the steps (position 108, FIG. 4) upon lowering movement of the hoisting block. Upon further opening of the hooks 98 to clear Z beam upper flanges 40, the hoisting block can be raised and retreived from well 37.

Hooks 98, when fully opened, can suspend Z beams 36 with their lower inturned flanges 32 clearing the sides of the pallets P, to permit pallet pick up from the green block conveyor section 14a and pallet release on dry block conveyor section 18a.

When picking up pallets or discharging the same onto rest surface, it should be noted that the rest surface must so support the pallets as to leave exposed the sides of the pallets that the Z beams can engage under these sides.

Each hook 98 is provided with a cam member 110 which serves to positively maintain the Z beams in engagement with the pallets P when the upper flange of the Z beams are being transferred onto the inwardly facing steps 34 of the columns 24 of a selected well. Each cam member is elongated and its upper end is pivoted to the respective hook 106 at 112 at a position below the pivots 102, 104. Cam member 110 has a lower end provided with a guide wheel 114 which is disposed below the lower end of the hook, namely below the hooking plate 100 so as to engage the central portion of the Z beam. Cam member 110 has an external cam edge 116 downwardly terminated by cavity 118. A cam follower 120 carried by the outer frame 80 engages cam edge 116 and causes the cam member 110 to positively maintain the lower inturned flange 42 into engagement with the underside of the pallet P during opening of the hooks 98 and transfer of the Z beams to the position 108 in FIG. 4. This Figure also shows that blocks C of different heights can be stored in the same well 37, to be cured.

FIGS. 5 and 6 show the preferred embodiment of the arrangement of the hooks and cam members identified by a hook 98a, a cam member 110a pivoted at 112a to hook 98a and a cam follower 120a carried by outer frame 80. In these Figures, the position of the pivots 102a and 104a and of cam follower 120a are as in the embodiment of FIG. 4, since pivots 102a and 104a are shown carried by the outer frame 80a and inner frame 82a respectively. Cam edge 116a of the cam member 110a now faces inwardly towards the centre of the well instead of outwardly as in FIG. 4. Cam follower 120a is carried by the inner frame instead of the outer frame. The hook 98a and cam member 110a shown in FIGS. 5 and 6 are preferred but outer pivot 102a and cam follower should be carried by inner frame 82 and inner pivot 104a should be carried by outer frame 80 as in FIG. 4 and for the same reason that is to support the load of blocks by the two outer pulleys, the hooks being then in closed position.

FIG. 5 shows the hook and cam in an intermediate open position similar to position 108 for transfer of the Z beam onto or from steps 34 while FIG. 6 shows the position of the hook, cam and Z beam assembly in a fully open limit position clearing the side edge of the pallets to pick up or discharge the same from or onto a rest surface as above noted.

Figure 11:
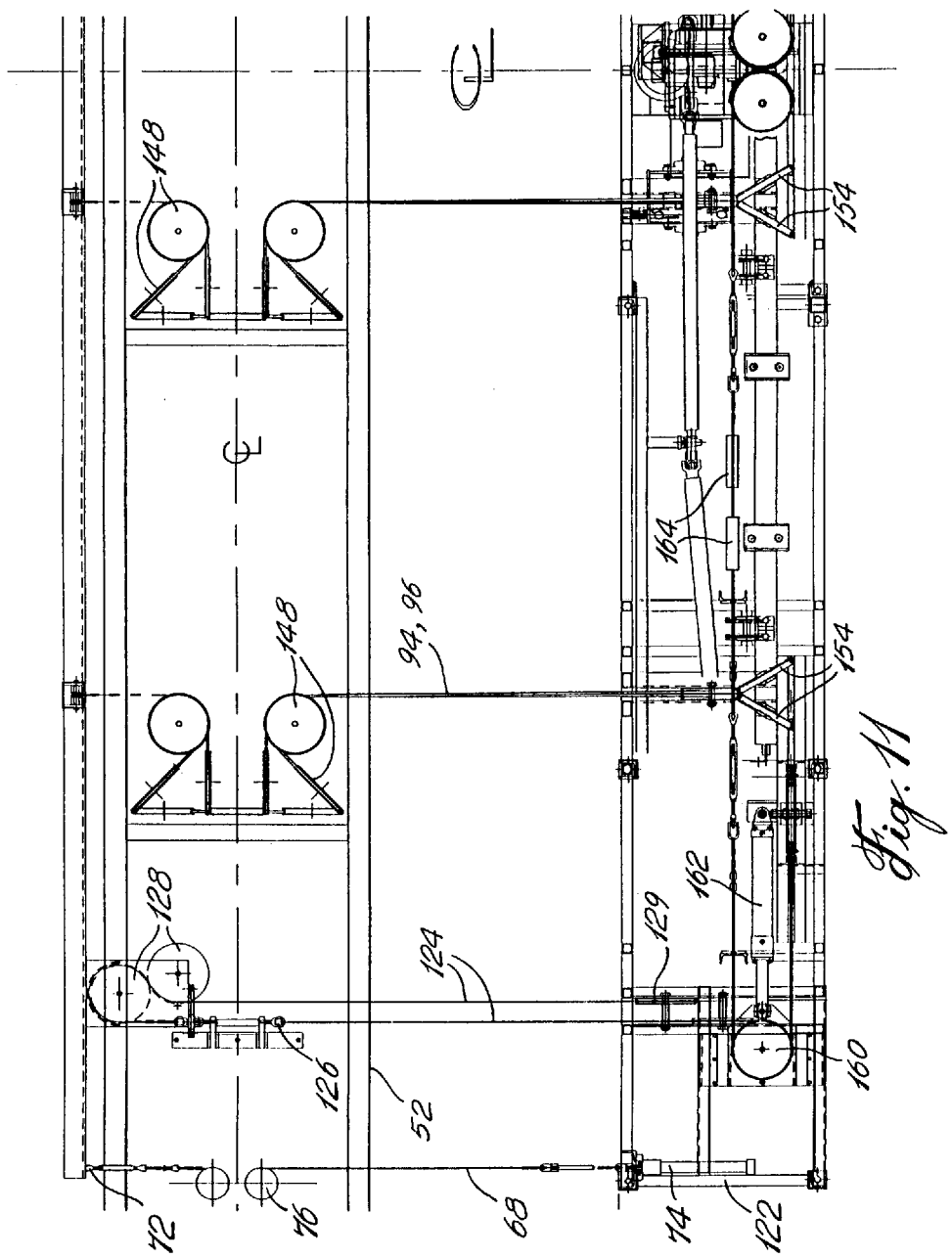
FIG. 11 is a top plan view of half of the travelling bridge with its cable and pulley arrangement and of the actuating arrangement located on the outside of the kiln.
Figure 12:
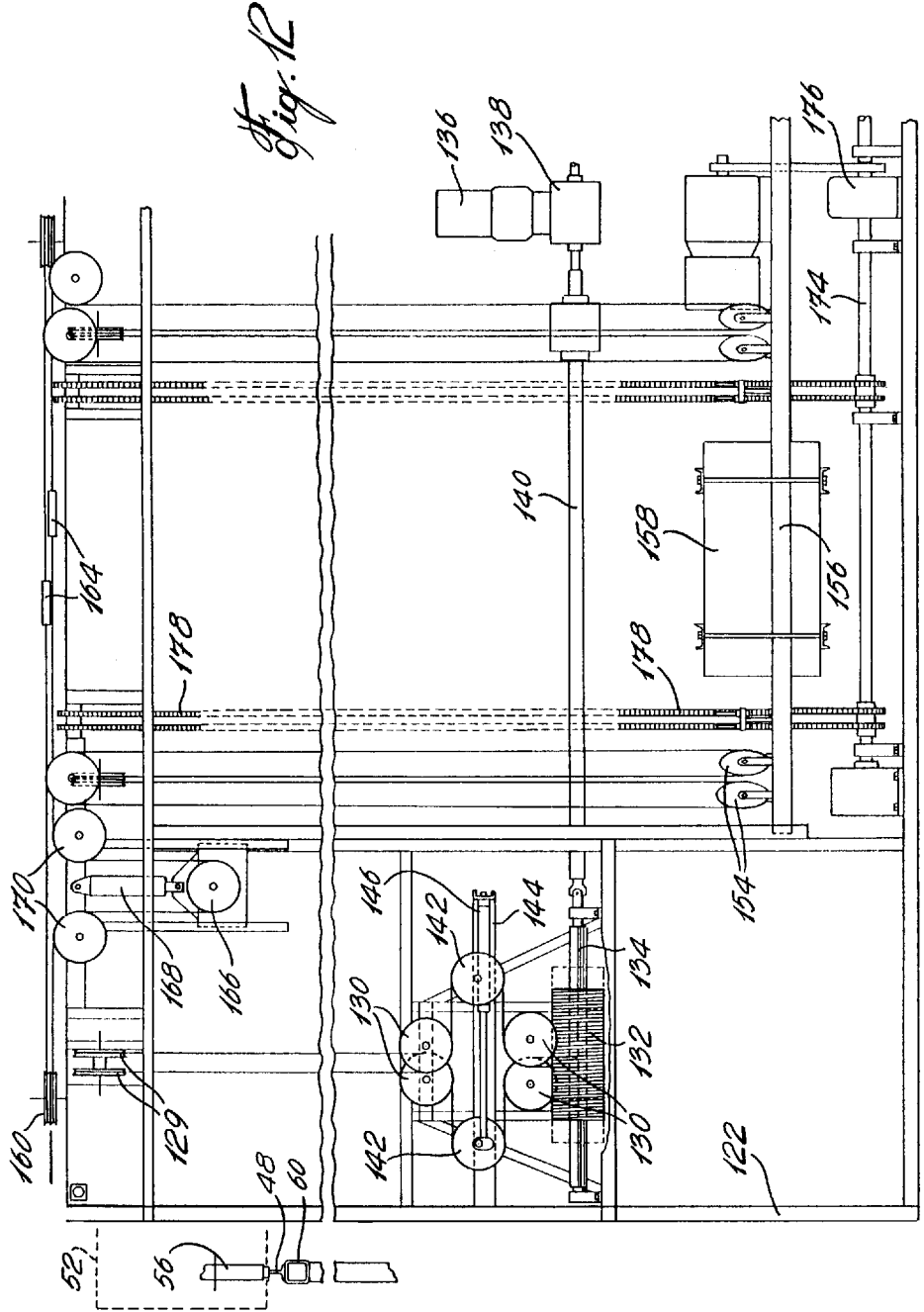
FIG. 12 is an elevation of one half of the actuating arrangement.

FIGS. 10, 11 and 12 show the cables and the actuating system for moving the travelling bridge 52 along the rails 48, for locking the same above any well 37 or 70 and conveyors 14a or 18a and for raising and lowering the assembly of the sub-blocks 54a including the above noted cable means for opening and closing the hooks 98 or 98a. Due to the fact that the crane must enter the kiln which has a humid and hot atmosphere, the above noted movements are in accordance with an important feature of the invention controlled from the outside of the kiln through cable means and through driving means located and carried by a frame work 122 fixedly mounted on the floor of the plant on the outside of the conveyors 14 and 18 as shown in FIG. 1.

Travelling bridge 52 is moved along rails 48 by a cable and drive arrangement for each end of the travelling bridge. A cable 124 is attached at its ends 126 to the travelling bridge, is trained on pulleys 128 anchored at the remote end of the kiln, is trained on a pair of top pulleys 129 and on two pairs of pulleys 130 carried by the frame work 122 and is wound several turns on a winch drum 132 rotatably driven by a driving shaft 134 of polygonal cross-section on which the drum is axially movable. single electric motor 136 actuates through a gear box 138, the two drive shafts 134, one for each end of the travelling bridge, through the transmission shafts 140.

There are further provided means to align the travelling bridge with the wells 37, the two runs of the cable loop formed by the cable 124 are trained on the opposite sides of a pair of pulleys 142 mounted between pulleys 130 on a common frame 144, the horizontal position of which can be adjusted by a double acting hydraulic cylinder 146. Operation of cylinder 146 causes shortening of the pay-out run of cable 124 and simultaneous corresponding lengthening of the return run of said cable. Such a system can be provided at one end only of the travelling bridge.

As previously noted, the cables 94, 96 which are trained on the pulleys 90, 92 carried by the respective hoisting sub-blocks 54a serve to open and close the hooks and also to lower and raise the hoisting block. Cables 94, 96 are trained on pulleys 148 carried by the travelling bridge, and are anchored at 150 to the remote end of the kiln. Their other sections are trained on pulleys 152 carried by frame work 122, then on pulleys 154 carried by a beam 136 on which is mounted a counter-weight 158. The two cables are trained on a double pulley 160 horizontally movable and adjustable by a hydraulic cylinder 162. In the example shown, there are four sub-blocks 54*a* and it is seen that the same cables 94, 96 are common to two sub-blocks. The same system is repeated for the remaining two sub-blocks. It will be understood that by adjusting the position of the double pulley 160 at each pair of sub-blocks 54*a,* the hoisting block 54 can be levelled so that the hooks 98 or 98*a* over the entire length of the hoisting block will be at the appropriate level with respect to the same level steps along the length of the wells.

Adjusting of the position of the double pulley 160 at each end can be required depending on the uneven loading of the hoisting block and consequently of the uneven elongation of the cables 94, 96. Cable elongation is measured by load cells 164 mounted on each cable 94, 96 and the measurement made by the load cell serves to adjust the position of the hydraulic cylinders 162.

The hooks 98 or 98*a* can be open or closed by shifting the longitudinal position of inner cable 94 with respect to outer cable 96. This is done by training cable 94 on a vertically movable pulley 166 actuated by hydraulic cylinder 168 carried by frame work 132. Pulley 166 is disposed between a pair pulleys 170 carried by frame work 122. The counterweight 158 is made heavier than the hoisting block 54 and its load so as to automatically raise the same to their upper limit position entirely nested within the travelling bridge 52. To lower the hoisting block and its load, an electric motor 172 drives a shaft 174 through a speed reducer 176. Shaft 174 drives vertically mounted sprocket chains 178 attached to the counter-weight carrying beam 156.

The Z beam accumulator 20 is shown in FIG. 2 and in FIG. 13. The Z beams 36 are stacked between two spaced, vertical guide rails 180 in vertical register with the respective sides of the pallets P deposited on the dry block conveyor section 18*a.* As shown in FIG. 13, the edge of the outturned upper flange 40 of each Z beam 36 is exposed between the guide rails; therefore the head 182 of the piston of an inclined ram 184 can engage the edge of the upper flange 40 and push it and retain it against a holder 186 carried by a bracket 188 on which ram 184 is mounted. Bracket 188 is pivoted about a horizontal axis 190 on a frame work 192 vertically movable alongside the guide rails 80 by means not shown. Frame 192 carries a ram 194 which serves to rotate bracket 188 above pivot 190. Adjustment of the bolt and nut 196 serves to adjust the position of Z beam 36 away from or towards the pallet P. Inward pivoting of the brackets 188 positively releases the Z beams from engagement with the hooks 98 or 98*a* carried by the hoisting block. After the hoisting block has moved away, the brackets 188 are pivoted to the upright position shown in FIG. 13 and the Z beams still retained by the inclined rams 184 within holders 186 can be positively lowered between the guide rails 180 and brought to a stacked position. The reverse operation is shown in FIG. 13, wherein the topmost Z beam is raised and its inturned flange caused to positively engage the underside of the pallets P in a position to be picked up by hooks 98 of the hoisting block.

Referring to FIG. 2, additional wells 70 may be provided alongside wells 37, wells 70 defined by columns 198 similar to columns 24 but without any steps 34. The travelling bridge 52 can be stopped in register with any well 70 and the hoisting block caused to lower a set of concrete blocks carrying pallets P by means of the Z beams 36, the hoisting block being guided by the columns 198. In this manner, pallets P carrying concrete blocks C which are not fully cured can be directly stacked onto another group of uncured blocks C to complete the curing of the concrete blocks.

The system of the invention operates as follows: at the start of the operation, no pallets P are on the dry block conveyor section 18*a.* Therefore a pair of Z beams 36 can be elevated to the level of the conveyor section 18*a* by the rams 84 and holders 86 to be picked up by the hooks 98 or 98*a* of the hoisting block 54. Travelling bridge 52 is moved over the green block conveyor and the hoisting block 54 together with the Z beams are lowered and the hooks 98 cause the Z beams to engage under the series of green block carrying pallets assembled at said station. The hoisting block together with the assembly of the two Z beams and green blocks carrying pallets is raised and nested within the travelling bridge. Door 12 is opened and the travelling bridge is moved on rails 48 and stopped over a selected well 37 (as shown in FIG. 2); the hoisting block with its load is lowered being guided by columns 24. During the lowering movement, the hooks are fully closed so that the Z beams clear the column steps 34. The hoisting block is stopped at a precise selected level so that the upper flanges 40 of the Z beams are just above the selected steps where the Z beams are to be suspended. The hooks 98 or 98*a* are opened to their intermediate position and then hoisting block 54 is slightly lowered to cause transfer of the Z beams from the hooks to the steps 34. The hoisting block is then lowered, the hooks are fully open to clear the upper flanges 40 of the beam 36 and the hoisting block is moved to its uppermost position, fully nested within the travelling bridge 52 which can then repeat the cycle by first picking up another pair of Z beams from the Z beam accumulator 20. Each well 37 is loaded starting from the lowermost level as shown in FIG. 2.

Preferably, after partial curing of the concrete blocks, they are transferred to stacked position between columns 198 to complete their curing. After full curing, the blocks are removed from the kiln and transferred onto dry block conveyor section 18*a* while the Z beams are stacked into the Z beam accumulator. The conveyor 18 moves the dry blocks to a shipping station.

We claim:

1. The combination of a storage rack and of a loading and unloading system for article-carrying pallets to be stored within and retrieved from said storage rack, said storage rack comprising a plurality of spaced columns arranged in parallel rows to form several open top elongated storage wells disposed side by side, the columns on each side of any one well having a series of vertically spaced upwardly facing steps equally protruding from said columns towards the centre of said well, said steps forming sets of steps which are at the same level; said loading and unloading system comprising a pallet holder to carry a series of said pallets in end-to-end relation, said pallet holder comprising a pair of separate Z beams disposable along opposite sides of said series of pallets, each beam of Z-shaped cross-section defining a lower inturned flange to extend under and support said series of pallets and an upper outturned flange, a crane including a hoisting block, motorized means to move said hoisting block over and across said wells and to stop said hoisting block above a selected well, means to lower and hoist said hoisting block between said columns of said selected well, a pair of hooks pivotally carried by and depending from said hoisting block, actuating means to pivot said hooks towards and away from each other between an opened and a closed position relative to said hoisting block, the upper outturned flange of said Z beams engageable by said hooks whereby said article carrying pallets can be suspended by said hooks through said Z beams, the assembly of said article carrying pallets, said Z beams, said hooks and said hoisting block clearing said steps when said hooks are in closed position so that said article-carrying pallets can be hoisted or lowered through said well up from or down to a selected level, opening of said hooks from said closed position causing spreading apart of said outturned flanges of said pair of Z beams and allowing their transfer into engagement with a corresponding set of steps at said selected level.

2. The combination as defined in claim 1, wherein said lower inturned flange of said Z beams has a size to extend only under a side marginal portion of said pallets, and said hooks can pivot to a more opened position to cause said lower inturned flange to clear said side marginal portions of said pallets when the latter are supported on a support surface leaving said marginal portions exposed.

3. The combination as defined in claim 1, further including guiding means to guide said hoisting block when hoisted or lowered through any selected well.

4. The combination as defined in claim 3, wherein said storage wells are of equal width and length and said series of steps are equally spaced along said columns, said Z beams having a length substantially equal to the length of said storage wells.

5. The combination as defined in claim 4, wherein each well is subdivided into sub-wells of quadrangular cross-section and delimited by said columns located at the four corners of said sub-wells, said hoisting block being subdivided into sub-blocks interconnected in end-to-end relationship, any one sub-block being quadrangular and of a width and length to be hoisted and lowered between and guided by the columns delimiting a sub-well.

6. The combination as defined in claim 5, wherein said hoisting sub-blocks have vertical elongated guiding members at the four corners of the same, and guiding wheels carried by the upper and lower ends of said guiding members.

7. The combination as defined in claim 3, wherein said motorized means includes a travelling bridge movable over and across said wells, and further including first and second cable means extending between said hoisting block and said travelling bridge, said hoisting block including an outer frame and an inner frame guided for vertical movement with respect to each other, abutment means carried by said frames to limit their relative vertical movement, said outer and inner frames respectively connected to said first and second cable means, the upper end of each said hook pivoted to said outer and inner frames by pivots transversely spaced relative to both frames whereby selective hoisting movement of said outer and inner frames by said first and second cable means will cause pivoting of said hooks between said closed position and said opened position.

8. The combination as defined in claim 7, further including a cam member which extends along each hook and has an upper end pivoted to said hook, each cam member having a lower portion protruding downwardly from the lower end of said hook and engageable with the outside of a Z beam suspended from several said hooks, each cam member having a cam edge, and a cam follower carried by one of said frames and following said cam edge during pivoting movement of said hooks whereby upon opening movement of said hooks and consequently of the outturned flanges of said Z beams, said inturned flanges of said Z beams are positively maintained by said lower portions of said cam members in supporting engagement with said series of pallets, and upon closing movement of said hooks said lower portions of said cam members positively push said Z beams inwardly towards said pallets causing said inturned lower flanges to come in supporting engagement with said series of pallets.

9. The combination as defined in claim 8, wherein said storage wells are of equal width and length and said series of steps are equally spaced along said columns, said Z beams having a length substantially equal to the length of said storage wells, each well being subdivided into equal size sub-wells of rectangular cross-section and delimited by said columns being located at the four corners of said sub-wells, said hoisting block being subdivided into as many sub-blocks as there are sub-wells, said sub-blocks interconnected in end-to-end relationship, any one sub-block being rectangular and of a width and length to be hoisted and lowered between and guided by the columns delimiting a sub-well, said first and second cable means including, for each sub-block, a looped cable anchored to a stationary station at the opposite end of said rack relative to said one end of said rack and a counter weight suspended by said looped cables and biasing said interconnected sub-blocks to an uppermost position clearing the top of said wells when said sub-blocks are not loaded with article-carrying pallets.

10. The combination as defined in claim further including levelling means to level the assembly of interconnected sub-blocks.

11. The combination as defined in claim 10, wherein said levelling means include power actuated means to selectively shorten or lengthen one of said looped cables with respect to the other.

12. The combination as defined in claim 7, further including a pair of rails horizontally disposed at the top of said storage rack perpendicularly to and along the respective ends of said storage wells, said rails extending beyond one end of said storage rack, said travelling bridge rollable on and guided on said rails, said first and second cable means trained on pulleys carried by said travelling bridge, power operated cable shortening means to shorten one of said first and second cable means relative to the other, power operated cable pay out and retrieving means operating said first and second cable means to lower and hoist said hoisting block relative to said travelling bridge, third cable means and power operated winch means to selectively move said travelling bridge across said wells to positions above any selected well and an outer position laterally outward of said one end of said storage rack, said cable shortening means, cable pay-out and retrieving means and winch means being located laterally outwardly of said one end of storage rack.

13. The combination as defined in claim 12, wherein said third cable means include a cable loop associated with and attached to each end of said travelling bridge, said winch means including a winch for each cable loop, each cable loop including a pay-out run and a return run extending between said winch and said travelling bridge and means to align said travelling bridge with said wells including powered cable shortening means for at least one cable loop to alternately shorten and lengthen said pay-out run and simultaneously alternately lengthen and shorten said return run an equal amount.

14. The combination as defined in claim 13, wherein each winch includes a drive shaft of polygonal cross-section, a winch drum non-rotatably mounted and axially shiftable on said drive shaft, said drum having a helicoidal groove receiving a few turns of the loop cable driven by said drum.

15. The combination as defined in claim 14, wherein the drive shafts are driven by a common motor.

16. The combination as defined in claim 7, wherein said travelling bridge has an inverted U-shape and said hoisting block has a size and shape such that, in its uppermost hoisted position, it completely nests within said travelling bridge to clear the top of said wells.

17. The combination as defined in claim 16, further including vertical, elongated guiding members carried by said travelling bridge and in vertical alignment with the columns of said selected well above which said hoisting block is stopped, and guide wheels carried by said hoisting block, engageable only with said guiding members when said hoisting block completely nests within said travelling bridge, engageable both with said guiding members and with the columns of said selected well when said hoisting block is partially nested within said travelling bridge and engageable only with the columns of said selected well when said hoisting block is completely located within said selected well.

18. The combination as defined in claim 17, further including a vertically movable locking pin carried by said travelling bridge at each end thereof, a pulley attached to each locking pin, fourth cable means extending along both rails trained on each pulley and anchored to a fixed point at one end and fourth cable tightening means attached to the other end of said fourth cable means to selectively tighten said fourth cable means with the consequent raising of said locking pin or release of said fourth cable means with the consequent lowering of said locking pin, and abutment means at each well and along each rail to engage said locking pins only when the latter are lowered and to consequently positively position said travelling bridge in vertical alignment with said selected well.

19. The combination as claimed in claim 1, wherein said columns have an H-shaped cross-section defining a web and right angle flanges, said hoisting block carrying guiding wheels engageable with said flanges of said columns to guide said hoisting block during its hoisting and lowering movement within any one storage well.

20. The combination as defined in claim 1, wherein said columns have an H-shaped cross-section defining a web and right angle flanges and said steps are formed by stamped, outwardly inclined portions of said flanges of said columns.

21. The combination as defined in claim 1, wherein said storage wells are of equal width and length and said series of steps are equally spaced along said columns, said Z beams having a length substantially equal to the length of said storage wells and wherein said rows of columns are common to those of said wells which are adjacent to one another.

22. The combination as defined in claim 1, wherein each Z beam has a web formed of an upper section and of a lower section, both sections making an obtuse angle with respect to each other, said upper section terminated by said outturned flange and of a width sufficient to abut against two adjacent vertically spaced sets of steps when said outturned flange is hooked onto the upper one of said two sets of steps, to therefore maintain said lower section at a downwardly inwardly inclined position so that said pallets can be made of a size to clear said steps with a sufficient gap during their hoisting and lowering movement through said well and yet be positively maintained in stored position by the lower inturned flanges of said Z beams.

23. The combination as defined in claim 1, further including an enclosure in which said rack is located, said enclosure having walls, a roof and heating means to form a concrete block curing kiln, said roof spaced above said wells, one of said walls having an opening to access the top of said rack, a door for said opening, said articles being green concrete blocks to be cured in said kiln with the blocks and pallets carrying the same stored in said wells with the green blocks on one set of aligned pallets spaced below an adjacent set of aligned green block carrying pallets.

24. The combination as defined in claim 23, further including a storage floor area within said kiln, said motorized means capable of moving said hoisting block over said floor area as well as over and across said wells, said crane capable of successively loading said wells of said kiln with pellets carrying green blocks and, after partial curing of said blocks within said kiln, of successively unloading the partially cured blocks together with their supporting pallets from a selected well and directly stacking said blocks and their pallets onto said floor area and retrieving said Z beams to form stacks of blocks with intervening pallets, said blocks left to fully cure in said kiln.

25. The combination of a storage rack and of a loading and unloading system for article-carrying pallets to be stored and retrieved from said storage rack, said storage rack defining vertical elongated wells arranged side by side in parallel rows and delimited by parallel rows of columns, each well being of uniform width and length and fully opened at the top, said loading and unloading system including crane means including a travelling bridge and a hoisting block and movable over and across said storage rack, said hoisting block operable to hoist or lower an article-carrying pallet from and onto support surfaces outside of said storage rack, move said pallet over said storage rack in vertical register with any selected well and then lower or hoist said article-carrying pallet down or up said well to or from a selected level and further including means carried by said hoisting block and actuated from said travelling bridge to lock and unlock said pallet within said well at said level.

* * * * *